(12) United States Patent  (10) Patent No.: US 9,142,223 B2
Watanabe  (45) Date of Patent: Sep. 22, 2015

(54) SOUND PROCESSING TO PRODUCE TARGET VOLUME LEVEL

(71) Applicant: Mitsuaki Watanabe, Nagoya (JP)

(72) Inventor: Mitsuaki Watanabe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 460 days.

(21) Appl. No.: 13/628,707

(22) Filed: Sep. 27, 2012

(65) Prior Publication Data

US 2013/0085749 A1  Apr. 4, 2013

(30) Foreign Application Priority Data

Sep. 30, 2011  (JP) ................................ 2011-218494

(51) Int. Cl.
  *G10L 21/00*  (2013.01)
  *G10L 21/0208*  (2013.01)
  *H04M 9/08*  (2006.01)
  *G06F 3/16*  (2006.01)

(52) U.S. Cl.
  CPC ............ *G10L 21/0208* (2013.01); *G06F 3/165* (2013.01); *H04M 9/08* (2013.01)

(58) Field of Classification Search
  CPC ........................................................ H04M 9/08
  USPC ......... 704/225; 381/107; 379/388.01, 388.03, 379/388.06, 406.01
  See application file for complete search history.

(56) References Cited

U.S. PATENT DOCUMENTS

| 4,568,611 | A |   | 2/1986 | Amirsakis et al. |
| 5,212,722 | A | * | 5/1993 | Murata .......................... 455/570 |
| 5,485,515 | A | * | 1/1996 | Allen et al. .................... 379/391 |
| 5,796,819 | A | * | 8/1998 | Romesburg .............. 379/406.09 |
| 5,852,769 | A | * | 12/1998 | Ahmed et al. ................. 455/116 |
| 5,966,438 | A | * | 10/1999 | Romesburg .............. 379/388.03 |
| 5,970,137 | A | * | 10/1999 | Le Damany et al. ...... 379/388.01 |
| 6,298,247 | B1 | * | 10/2001 | Alperovich et al. .......... 455/558 |
| 6,487,178 | B1 | * | 11/2002 | Romesburg et al. ........... 370/286 |
| 6,744,882 | B1 | * | 6/2004 | Gupta et al. ................ 379/387.01 |
| 7,869,768 | B1 | * | 1/2011 | Vishlitzky ................... 455/67.13 |
| 8,699,723 | B2 | * | 4/2014 | Fried et al. .................... 381/104 |
| 8,938,081 | B2 | * | 1/2015 | Goerke ......................... 381/104 |
| 2005/0004796 | A1 | * | 1/2005 | Trump et al. ................. 704/225 |

FOREIGN PATENT DOCUMENTS

JP  4-228109 A  8/1992
JP  6-075588 A  3/1994

* cited by examiner

*Primary Examiner* — Shaun Roberts
(74) *Attorney, Agent, or Firm* — Banner & Witcoff, Ltd.

(57) ABSTRACT

A sound process apparatus includes a processor. The processor may execute instructions, which are stored on a memory, and when executed cause the sound process apparatus to perform operations. An obtaining operation may obtain sound data in a remote site. A first determining operation may determine volume levels of voice and noise in the remote site based on the sound data. A second determining operation may determine a volume level of noise in a local site based on the sound in the local site. A third determining operation may determine a target volume level based on the volume level of the voice in the remote site, the volume level of the noise in the remote site, and the volume level of the noise in the local site. A notifying operation may notify a user of the target volume level.

15 Claims, 10 Drawing Sheets

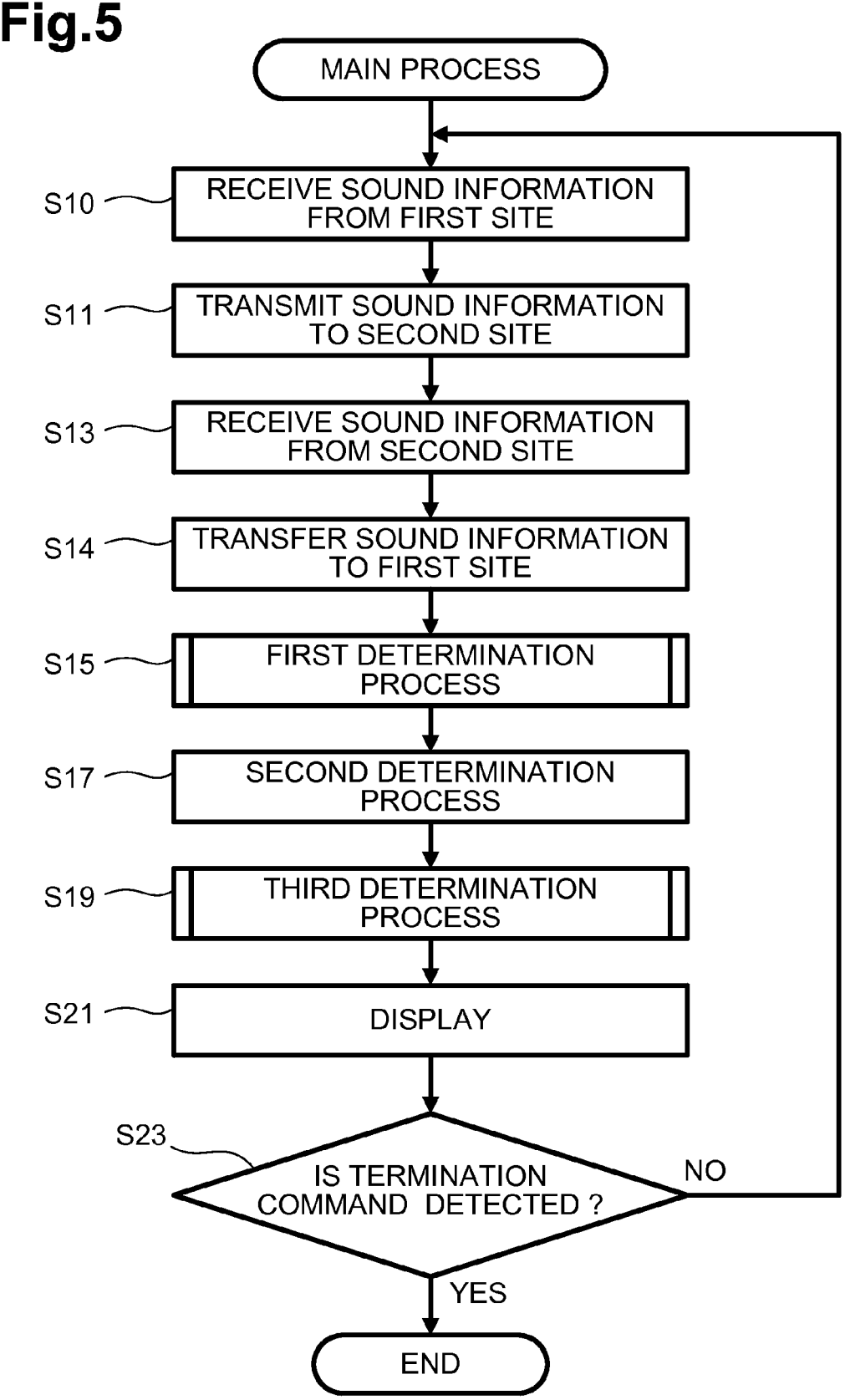

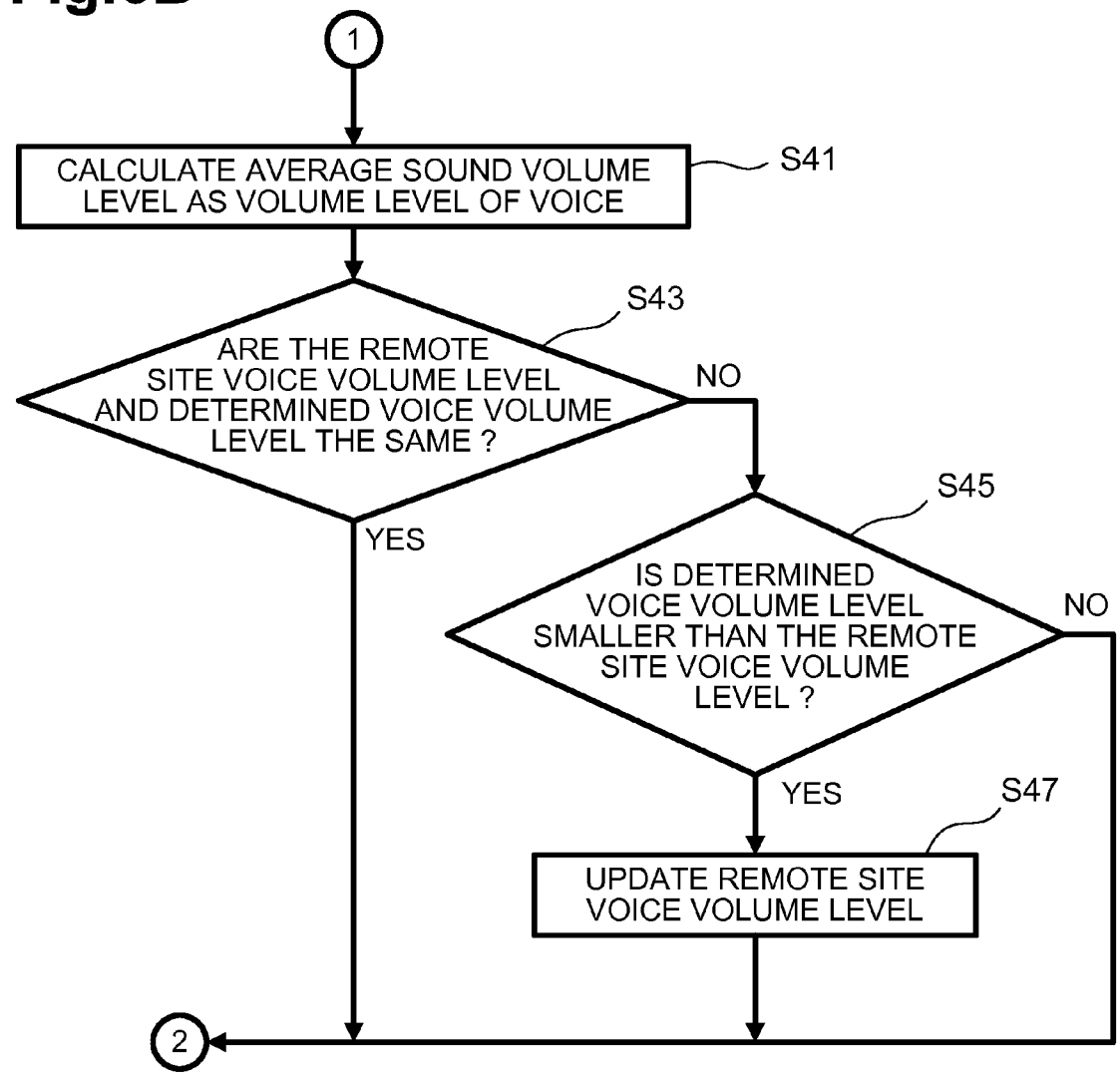

SOUND PROCESSING TO PRODUCE TARGET VOLUME LEVEL

CROSS-REFERENCE TO RELATED APPLICATION

This application claims priority from JP2011-218494 filed on Sep. 30, 2011, the content of which is hereby incorporated by reference.

BACKGROUND OF THE DISCLOSURE

1. Field of the Disclosure

The present disclosure relates to a sound process apparatus having a sound-volume notification function, a sound processing method, and a computer readable storage medium.

2. Description of the Related Art

A known sound process apparatus transmits sound collected by a microphone to another sound process apparatus disposed in a remote site via a network, and simultaneously receives sound in the remote site via the network and outputs the sound from a speaker. The sound includes, for example, voice produced by a user. Such a sound process apparatus is widely used in a teleconference system or the like. One example of such a sound process apparatus is a speakerphone.

If voice is output as an example of sound from the speaker, the sound output from the speaker normally contains the voice and noise. In order for a user to clearly hear the voice output from the speaker, it is desirable that the volume level of the voice be greater than the volume level of the noise. Therefore, in order for another user using another sound process apparatus to clearly hear and recognize the user's voice, it is preferable that the user produce the voice loudly so that the user's voice is output with a large volume level from the speaker in the other sound process apparatus. For example, in the related art, there has been proposed technology for making a user produce a loud voice by turning on a lamp in accordance with the ratio between the volume level of the collected voice and the volume level of the noise so as to obtain voice with a volume level necessary for recognizing the voice.

SUMMARY OF THE DISCLOSURE

Conditions for the user in the remote site to recognize the voice of the user in the local site transmitted from the speaker by distinguishing the voice from the noise vary depending on an environment in which the sound process apparatus in the remote site is used. For example, in a case where the volume level of the noise in the remote site is large, in order for the user in the remote site to distinguish the voice of the user in the local site from the noise, it is necessary to sufficiently increase the volume level of the voice relative to the volume level of the noise contained in the sound collected by the microphone in the local site. Therefore, even if the user in the local site produces a loud voice by utilizing the technology in the related art, the volume level of the user's voice in the local site output from the speaker in the remote site may be insufficient. In this case, the user in the remote site cannot sufficiently recognize the voice of the user in the local site output from the speaker.

Accordingly, aspects of the present disclosure provide a sound process apparatus, a sound processing method, and a computer readable storage medium for causing voice with an appropriate volume level to be produced so that the voice can be heard by another user using another sound process apparatus.

BRIEF DESCRIPTION OF THE DRAWINGS

FIG. 5 is a flowchart illustrating a main process;

FIG. 6B is a flowchart continuing from FIG. 6A;

DETAILED DESCRIPTION

Figure 1:
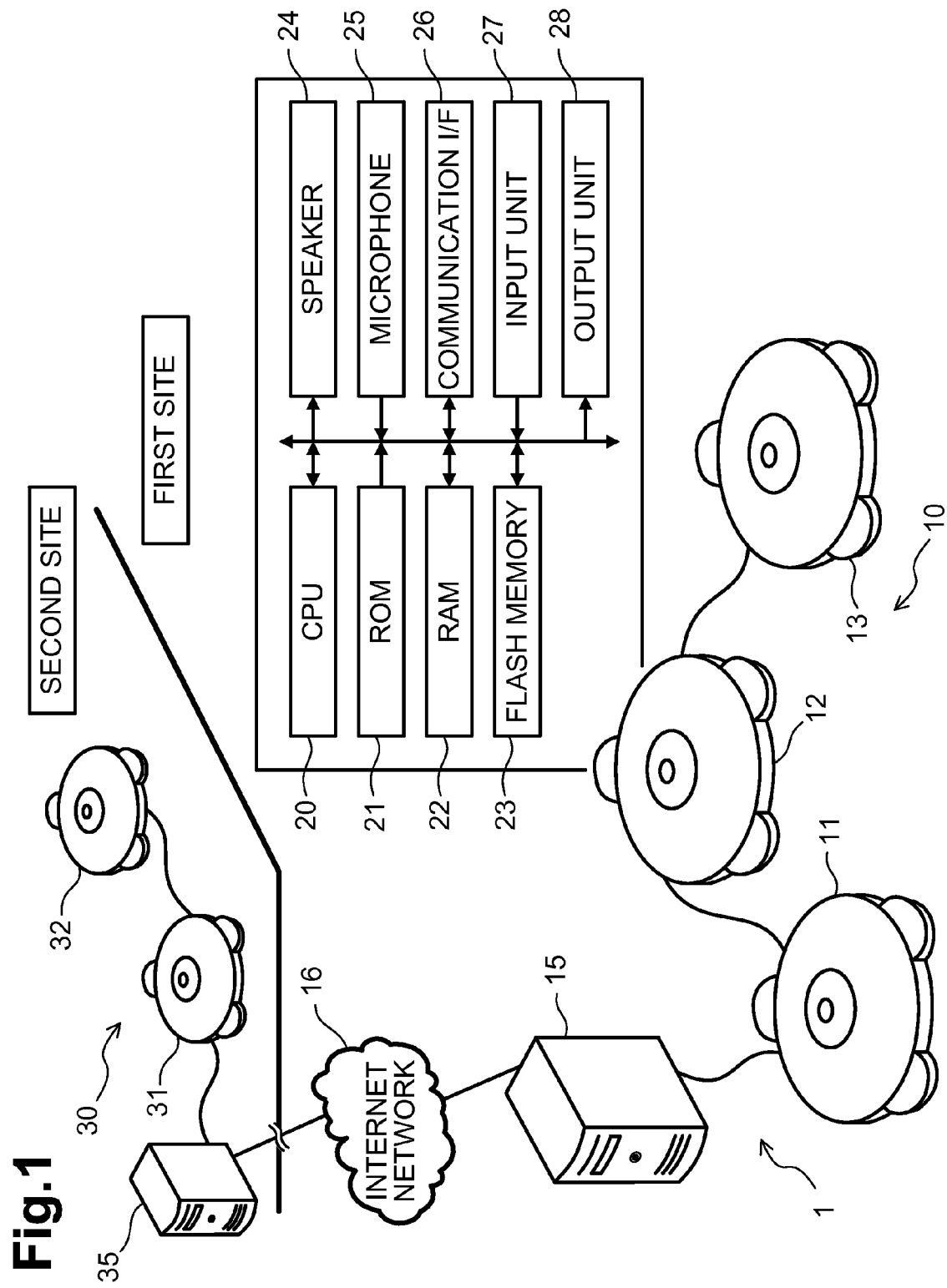
FIG. 1 schematically illustrates a conference system including sound process apparatuses, and also illustrates an electrical configuration of each sound process apparatus.

An illustrative embodiment of the present disclosure will be described below with reference to the drawings. These drawings are used for explaining the technical characteristics to which the present disclosure may be applied. Components of apparatuses to be described below, the flowcharts of various processes, and the like are simply examples and are not to be limited thereto. Therefore, a freely-chosen component may be added to, may substitute for, or may be removed from the components of each described apparatus, the flowchart of each process, and the like.

A conference system 1 will now be schematically described with reference to FIG. 1. The conference system 1 includes sound process apparatuses 11, 12, 13, 31, and 32 and personal computers (PCs) 15 and 35. The sound process apparatuses 11, 12, and 13 and the PC 15 are disposed in the same site (referred to as "first site" hereinafter). The sound process apparatuses 31 and 32 and the PC 35 are disposed in a site (referred to as "second site" hereinafter) different from the first site. The sound process apparatuses 11, 12, and 13 and the PC 15 are daisy-chain connected to each other via communication cables. The term "daisy-chain" refers to a connection technique for linking multiple apparatuses together in a row. The PC 15 is also connected to an Internet network 16. Likewise, the sound process apparatuses 31 and 32 and the PC 35 are daisy-chain connected to each other via communication cables. The PC 35 is also connected to the Internet network 16. In the following description, if the sound process apparatuses 11, 12, and 13 are not to be distinguished from each other, they will generically be referred to as sound process apparatuses 10. Likewise, if the sound process apparatuses 31 and 32 are not to be distinguished from each other, they will generically be referred to as sound process apparatuses 30.

The sound process apparatuses 10 disposed in the first site are capable of communicating with the sound process apparatuses 30 disposed in the second site via the PC 15, the Internet network 16, and the PC 35. Each sound process apparatus 10 transmits sound data collected by a microphone 25 (to be described later) to the sound process apparatuses 30, and also receives sound data from each sound process apparatus 30 and outputs the sound from a speaker 24 (to be described later). Users using the sound process apparatuses 10 in the first site can have an audio-based teleconference with users using the sound process apparatuses 30 in the second site. The users in the first site will be referred to as "first users" hereinafter, whereas the users in the second site will be referred to as "second users" hereinafter.

Furthermore, in the conference system 1, the sound process apparatuses 11, 12, and 13 can be scattered about a wide area within the first site. Voice based on the sound data transmitted from each sound process apparatus 30 disposed in the second site can be output from the speakers 24 in the sound process apparatuses 11, 12, and 13. Thus, the voice output from the speakers 24 can be heard over a wide area. Furthermore, the sound process apparatuses 10 can collect voices throughout the first site and transmit the data to the sound process apparatuses 30 disposed in the second site.

In the conference system 1, the PCs 15 and 35 may each be connected to a display and a camera. The PC 15 may transmit image data captured by the camera in the first site to the PC 35 via the Internet network 16. The PC 15 may receive image data from the PC 35 via the Internet network 16 and display the image on the display. Thus, the first users in the first site can have an image-and-audio-based teleconference with the second users in the second site.

An electrical configuration of each sound process apparatus 10 will now be described. An electrical configuration of each sound process apparatus 30 is the same as that of each sound process apparatus 10. Each sound process apparatus 10 includes a central processing unit (CPU) 20 that controls the sound process apparatus 10. The CPU 20 is electrically connected to a read-only memory (ROM) 21, a random access memory (RAM) 22, a flash memory 23, a speaker 24, a microphone 25, a communication interface (referred to as "communication I/F" hereinafter) 26, an input unit 27, and an output unit 28. The ROM 21 stores therein a boot program, a basic input/output system (BIOS), an operating system (OS), and the like. The RAM 22 stores therein a timer, a counter, and temporary data. The flash memory 23 stores therein a control program of the CPU 20. The communication I/F 26 is an interface for communicating with the PC 15 and the other sound process apparatuses 10. The sound process apparatus 10 is connected to the other two different apparatuses so that a daisy-chain connection is achieved. Therefore, the communication I/F 26 may include two or more interfaces for performing communication individually with the other two different apparatuses. However, if a daisy-chain connection is not to be achieved, one communication I/F 26 is also permissible. Furthermore, the communication I/F 26 may be constituted of, for example, a communication processing circuit and a connection port compatible with a general-purpose standard, such as Ethernet, universal serial bus (USB), or IEEE1394. The input unit 27 is a button to be used for performing various settings to the sound process apparatus 10. The output unit 28 is, for example, a liquid-crystal display for notifying the user or users of information. Alternatively, the output unit 28 may be constituted of multiple light-emitting diodes (LEDs).

Figure 2:
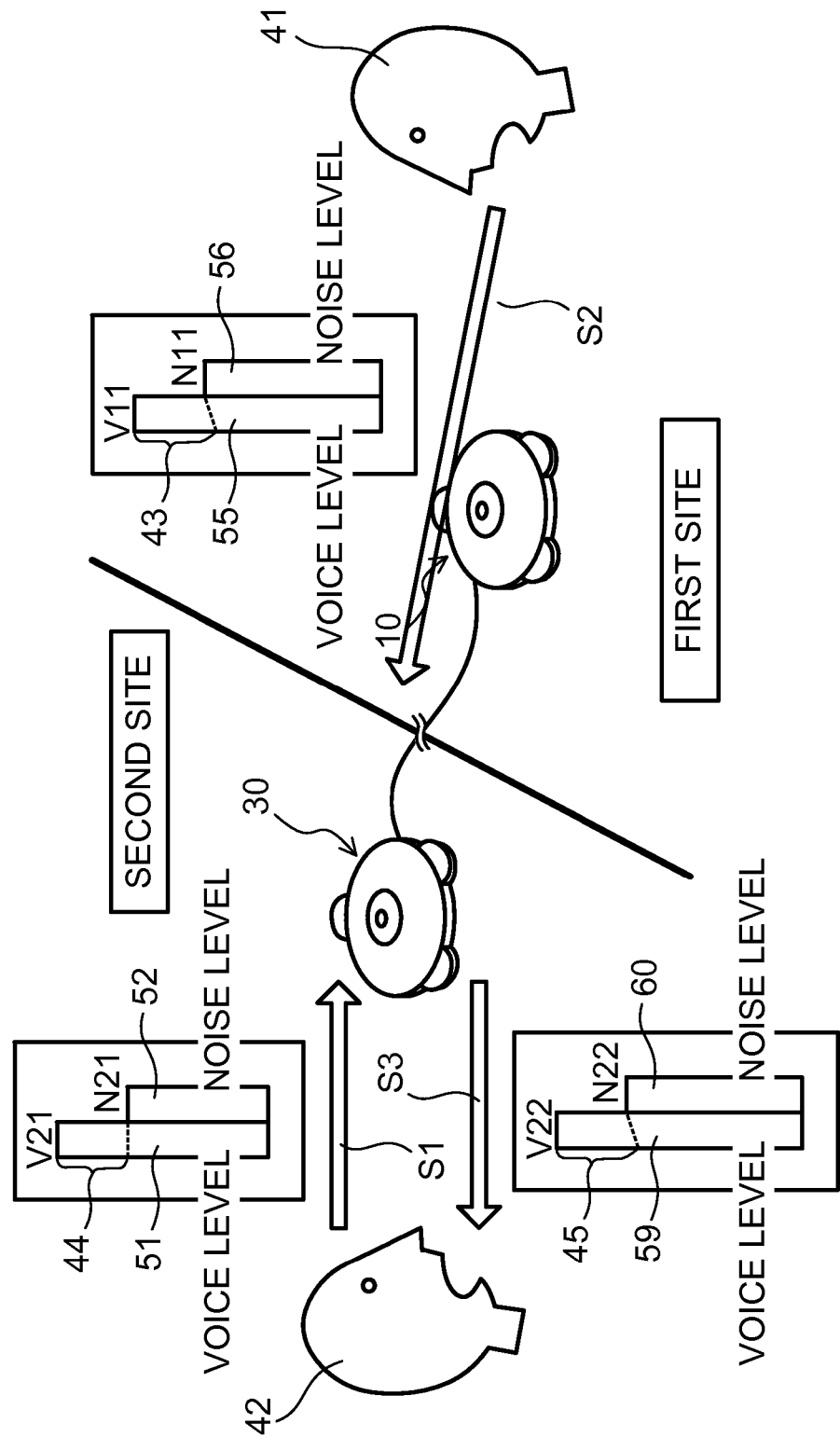
FIG. 2 is a diagram for explaining the volume level of voice and the volume level of noise.

The relationship between voice and noise in the first site and the second site will now be described with reference to FIG. 2. It is assumed that voice 51 (volume level V21) is produced by a second user 42 in the second site. The voice 51 propagates through the second site so as to reach one of the sound process apparatuses 30 (S1). The microphone 25 in the sound process apparatus 30 collects the voice 51 of the second user 42. While collecting the voice 51 of the second user 42, the microphone 25 in the sound process apparatus 30 also collects noise 52 (volume level N21) generated within the second site. The sound process apparatus 30 processes the collected voice 51 of the second user 42 and the collected noise 52 into data, and transmits the data to each sound process apparatus 10. Based on the data received from the sound process apparatus 30, the sound process apparatus 10 outputs the voice of the second user 42 from the speaker 24.

In the first site, voice 55 is similarly produced by a first user 41. The voice 55 of the first user 41 propagates through the first site (S2). The microphone 25 in the sound process apparatus 10 collects the voice 55 (volume level V11) and noise 56 (volume level N11). The sound process apparatus 10 processes the collected voice 55 of the first user 41 and the collected noise 56 into data, and transmits the data to the sound process apparatus 30.

The sound process apparatus 30 receives the data from the sound process apparatus 10. Based on the received data, the sound process apparatus 30 outputs voice 59 (volume level V22) of the first user 41 and noise 60 (volume level N22) from the speaker 24. The relationship between the volume level V11 of the voice 55 and the volume level N11 of the noise 56 collected by the microphone 25 in the sound process apparatus 10 in the first site is reflected in the relationship between the volume level V22 of the voice 59 and the volume level N22 of the noise 60 output from the speaker 24 in the sound process apparatus 30 in the second site. The voice 59 and the noise 60 output from the speaker 24 in the sound process apparatus 30 propagate through the second site (S3) so as to reach the second user 42.

In order for the second user 42 to recognize the voice of the first user 41 by distinguishing the voice from the noise, the volume level V22 of the voice 59 at least needs to be large enough to be recognizable by the second user 42 relative to the volume level N22 of the noise 60. Preferably, the volume level V22 of the voice 59 is greater than the volume level N22 of the noise 60. Furthermore, if the noise 52 is generated within the second site, the second user 42 would hear the noise 52 in addition to the voice 59 and the noise 60 output from the speaker 24 in the sound process apparatus 30. Therefore, in order for the second user 42 to recognize the voice of the first user 41 more properly, the volume level V22 of the voice 59 is preferably greater than the volume level N22 of the noise 60 output from the speaker 24 as well as the volume level N21 of the noise 52 within the second site.

In order for the second user 42 to properly recognize the voice of the first user 41, it is preferable that the first user 41 produce the voice 55 as loud as possible. However, because the first user 41 does not know the volume level of the noise 52 generated within the second site, when the first user 41 produces the voice 55 at a certain volume level, the first user 41 cannot determine whether the second user 42 can recognize the voice 59 at that volume level. In contrast, in this illustrative embodiment, the sound process apparatus 10 calculates a difference 44 between the volume level V21 of the voice 51 and the volume level N21 of the noise 52 based on the data of the voice 51 and the noise 52 collected by the microphone 25 in the sound process apparatus 30. Based on the calculated difference 44, the sound process apparatus 10 determines voice volume level from the first user 41 necessary for the second user 42 to distinctively recognize the voice 59 of the first user 41 over the noise 52 and the noise 60 as a target volume level of collected voice (referred to as "target volume level" hereinafter), and notifies the first user 41 of the target volume level. It is assumed that the second user 42 in the second site produces the voice 51 in view of the noise 52 generated within the second site and the distance to the sound process apparatus 30. Therefore, the sound process apparatus 10 determines a target voice so that a difference 43 between the voice 55 produced by the first user 41 and the noise 56 is at least greater than the difference 44. The first user 41 may produce voice with a volume level greater than or equal to the target volume level in response to the notification so that the second user 42 can distinctively recognize the voice 59 of the first user 41 over the noise 52 within the second site and the noise 60 output from the speaker 24 in the sound process apparatus 30. This will be described below in detail.

A method for determining the target volume level in the sound process apparatus 10 in the first site will now be described with reference to FIG. 3. First, the sound process apparatus 10 determines the volume level V21 of the voice 51 and the volume level N21 of the noise 52 (see FIG. 2) collected by the sound process apparatus 30 in the second site via the microphone 25. Then, the sound process apparatus 10 calculates a difference (V21−N21) by subtracting the volume level N21 from the volume level V21 (S6). Based on the difference (V21−N21), the sound process apparatus 10 can estimate an approximate distance between the second user 42 and the sound process apparatus 30 in the second site. For example, if the distance between the sound process apparatus 30 and the second user 42 is short, the volume level of the voice of the second user 42 reaching the sound process apparatus 30 would be large, resulting in a large difference. On the other hand, if the distance between the sound process apparatus 30 and the second user 42 is long, the volume level of the voice of the second user 42 reaching the sound process apparatus 30 would be small, resulting in a small difference.

Next, the sound process apparatus 10 calculates an increment D by multiplying the calculated difference (V21−N21) by a predetermined variable Y (S7).

$$D = Y \times (V21 - N21)$$

Figure 4:
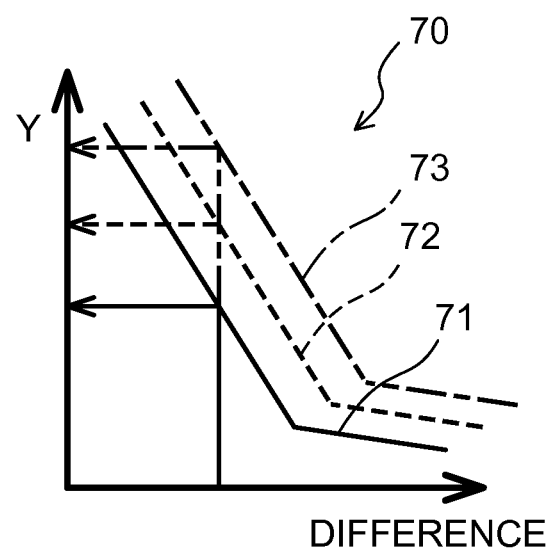
FIG. 4 is a graph schematically illustrating a function.

The variable Y is calculated by using a function 70 (see FIG. 4) stored in the flash memory 23. In FIG. 4, the vertical axis denotes the variable Y, whereas the horizontal axis denotes the difference (V21−N21). In the function 70, the variable Y decreases rapidly as the difference increases. When the difference exceeds a predetermined threshold value, the decreasing rate of the variable Y becomes smaller. In a region where the variable Y decreases rapidly, that is, a region where the volume level of the voice is small relative to that of the noise, the rate of change in the variable Y relative to the difference is large so as to ensure enough volume level for voice recognition. On the other hand, in a region where the decreasing rate of the variable Y is small, that is, a region where the volume level of the voice is large relative to that of the noise, the rate of change in the variable Y relative to the difference is small since a large difference does not significantly affect the degree of voice recognition. The variable Y is uniquely determined by applying the function 70 to the difference (V21−N21). When the function 70 is used, the variable Y tends to decrease as the difference (V21−N21) increases.

Furthermore, as shown in FIG. 4, the sound process apparatus 10 calculates the variable Y by using different functions 71, 72, and 73, depending on the type of sound process apparatus 30 and the environment in which the sound process apparatus 30 is installed. Thus, in accordance with the type of sound process apparatus 30 and the environment in which the sound process apparatus 30 is installed, the sound process apparatus 10 can appropriately determine the attenuation amount of the voice in the second site so as to determine an optimal target volume level. For example, if the sound process apparatus 30 installed in the second site is capable of outputting a loud voice, it is assumed that the sound process apparatus 30 can be used over a wider area. Therefore, it is conceivable that the sound process apparatus 30 and the second user 42 would be separated from each other by a large distance. In that case, the sound process apparatus 10 selects the function 73 so that a larger variable Y is selected. Consequently, the attenuation amount of the voice can be complemented more actively. Although the functions shown in FIG. 4 are connected proportional functions as an example, the functions may alternatively be connected to, for example, quadratic functions.

Figure 3:
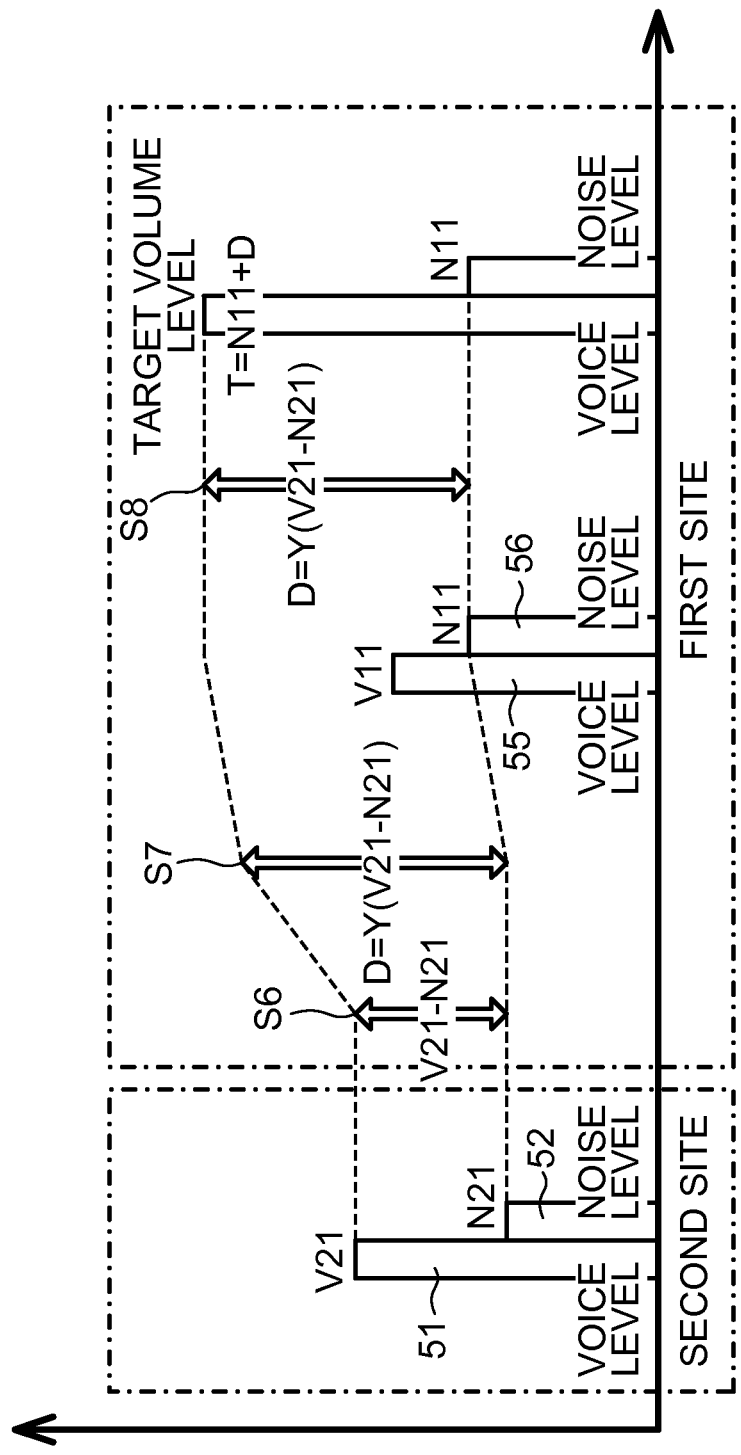
FIG. 3 is a diagram for explaining a target volume level.

As shown in FIG. 3, the sound process apparatus 10 determines the volume level V11 of the voice 55 and the volume level N11 of the noise 56 (see FIG. 2) collected via the microphone 25 provided in the sound process apparatus 10. The sound process apparatus 10 calculates a target volume level T by adding the increment D (=Y×(V21−N21)) calculated in S7 to the determined volume level N11 of the noise 56 (S8).

$$T = N11 + D = N11 + Y(V21 - N21)$$

The sound process apparatus 10 displays a screen for notification of the determined target volume level on the output unit 28. Thus, the sound process apparatus 10 notifies the first user 41 of the target volume level and prompts the first user 41 to produce voice with the target volume level. It is assumed that the voice from the first user 41 propagates through the first site (S2, see FIG. 2) and is collected by the microphone 25 in the sound process apparatus 10 at a volume level greater than or equal to the target volume level. The collected voice 55 of the first user 41 and the noise 56 (see FIG. 2) simultaneously collected by the microphone 25 in the sound process apparatus 10 are both processed into data, which is then transmitted to the sound process apparatus 30. Based on the data received from the sound process apparatus 10, the sound process apparatus 30 outputs the voice 59 (volume level V22) of the first user 41 and the noise 60 (volume level N22) from the speaker 24 (see FIG. 2). The output voice 59 of the first user 41 and the output noise 60 propagate through the second site (S3, see FIG. 2) so as to reach the second user 42. In this case, since the voice produced by the first user 41 is collected at a volume level greater than or equal to the target volume level, if the variable Y is greater than "1", a difference 45 (V22−N22) (see FIG. 2) between the volume level V22 of the voice 59 and the volume level N22 of the noise 60 becomes larger than the difference 43 (V21−N21) (see FIG. 2) between the volume level V21 of the voice 51 produced by the second user 42 and the volume level N21 of the noise 52. Therefore, the second user 42 can recognize the voice of the first user 41 by clearly distinguishing the voice from the noise.

Accordingly, the sound process apparatus 10 determines the target volume level based on the volume level V21 of the voice 51 and the volume level N21 of the noise 52 collected in the sound process apparatus 30. Therefore, by making the first user 41 produce voice with a volume level greater than or equal to the target volume level, the second user 42 can recognize the voice 59 of the first user 41 by clearly distinguishing the voice 59 from the noise 60 even if the sound environment varies for each second site.

A main process executed by the sound process apparatus 10 will now be described with reference to FIGS. 5 to 7. The main process to be described below is executed by the CPU 20 in the sound process apparatus 10 in accordance with a sound processing program stored in the flash memory 23. With regard to the sound processing program stored in the flash memory 23, a sound processing program preliminarily stored in a storage medium of another PC may be written into the flash memory 23 by using a reader provided in the PC. Alternatively, a sound processing program stored in a storage medium of a predetermined server connected via the Internet network 16 may be downloaded into the flash memory 23 in the sound process apparatus 10. The main process commences in response to activation of a main-process program stored in the flash memory 23 when the sound process apparatus 10 is turned on. Then, the CPU 20 executes this program, thereby performing the main process. The following description will be directed to the main process executed by the CPU 20 of the sound process apparatus 11 disposed in the first site in FIG. 1 as an example. Therefore, the sound process apparatus 11 is directly connected to the sound process apparatuses 12 and 13 within the first site. Moreover, the sound process apparatus 11 is connected to the sound process apparatuses 31 and 32 disposed in the second site via the PCs 15 and 35 and the Internet network 16.

In the main process, the volume level of voice corresponding to a local site (referred to as "local-site voice volume level" hereinafter), the volume level of noise corresponding to the local site (referred to as "local-site noise volume level" hereinafter), the volume level of voice corresponding to a remote site (referred to as "remote-site voice volume level" hereinafter), and the volume level of noise corresponding to the remote site (referred to as "remote-site noise volume level" hereinafter) are stored in the RAM 22.

As shown in FIG. 5, when the main process commences, the CPU 20 receives sound information transmitted from the sound process apparatuses 12 and 13 in step S10. The CPU 20 collects sound via the microphone 25 provided in the sound process apparatus 11. In step S11, the CPU 20 processes the collected sound into data, mixes the data with the sound information received from the sound process apparatuses 12 and 13 in step S10, and transmits the mixed data to the sound process apparatus 31 disposed in the second site. Then, the CPU 20 receives sound information transmitted from the sound process apparatus 31 in step S13, and transfers the sound information to the sound process apparatuses 12 and 13 in step S14. The CPU 20 stores the received sound information in the RAM 22. Based on the sound information, which is stored in the RAM 22, received from the sound process apparatus 31 disposed in the second site, the CPU 20 executes a process (first determination process, see FIG. 6) for determining the volume level of voice and the volume level of noise in step S15.

The first determination process will now be described with reference to FIG. 6. In step S30, the CPU 20 extracts sound information in predetermined units (e.g., 5 seconds) from the entire sound information received in step S13 (see FIG. 5) and stored in the RAM 22. The CPU 20 determines whether the degree of change in the volume level of the extracted sound information (i.e., volume level difference) is less than or equal to a predetermined level (e.g., 10 dB) continuously for a predetermined time period or longer (e.g., 3 seconds). If the CPU 20 determines that the degree of change in the volume level of the extracted sound information is smaller than or equal to the predetermined level continuously for the predetermined time period or longer (YES in step S31), the CPU 20 determines that the sound only includes noise but does not include voice. In step S33, the CPU 20 calculates an average sound volume level (for example, an intermediate sound level value or an equivalent noise level) within a predetermined time period and determines the average sound volume level as the volume level of the noise. The determined volume level of the noise will be referred to as "determined noise volume level" hereinafter.

The CPU 20 performs steps S35 to S39 so as to determine a maximum value of the volume level of noise included in the sound collected by each of the sound process apparatuses 31 and 32 disposed in the second site, and stores the maximum value as the remote-site noise volume level in the RAM 22. This will be described in detail. In step S35, the CPU 20 determines whether the remote-site noise volume level stored in the RAM 22 and the determined noise volume level are at the same level. If the remote-site noise volume level stored in the RAM 22 and the determined noise volume level are at the same level (YES in step S35), the process proceeds to step S49 without the CPU 20 updating the remote-site noise volume level stored in the RAM 22. On the other hand, if the remote-site noise volume level stored in the RAM 22 and the determined noise volume level significantly differ from each other (NO in step S35), the CPU 20 determines whether the determined noise volume level is greater than the remote-site noise volume level in step S37. If the determined noise volume level is greater than the remote-site noise volume level (YES in step S37), the remote-site noise volume level is updated in step S39 by storing the determined noise volume level as a new remote-site noise volume level in the RAM 22. The process then proceeds to step S49. On the other hand, if the determined noise volume level is smaller than or equal to the remote-site noise volume level (NO in step S37), the process proceeds to step S49 without the CPU 20 updating the remote-site noise volume level stored in the RAM 22.

On the other hand, if the volume level of the sound determined based on the sound information received in step S13 (see FIG. 5) exceeds the predetermined level within the predetermined time period, the CPU 20 determines that the degree of change in the volume level is large (NO in step S31). In this case, the CPU 20 determines that the sound includes voice. In step S41, the CPU 20 calculates an average sound volume level (for example, an intermediate sound level value or an equivalent noise level) within a predetermined time period and determines the average sound volume level as the volume level of the voice. The determined volume level of the voice will be referred to as "determined voice volume level" hereinafter.

The CPU 20 performs steps S43 to S47 so as to determine a minimum value of the volume level of voice included in the sound collected by each of the sound process apparatuses 31 and 32 disposed in the second site, and stores the minimum value as the remote-site voice volume level in the RAM 22. This will be described in detail. In step S43, the CPU 20 determines whether the remote-site voice volume level stored in the RAM 22 and the determined voice volume level are at the same level. If the remote-site voice volume level stored in the RAM 22 and the determined voice volume level are at the same level (YES in step S43), the process proceeds to step S49 without the CPU 20 updating the remote-site voice volume level stored in the RAM 22. On the other hand, if the remote-site voice volume level stored in the RAM 22 and the determined voice volume level significantly differ from each other (NO in step S43), the CPU 20 determines whether the determined voice volume level is smaller than the remote-site voice volume level in step S45. If the determined voice volume level is smaller than the remote-site voice volume level (YES in step S45), the remote-site voice volume level is updated in step S47 by storing the determined voice volume level as a new remote-site voice volume level in the RAM 22. The process then proceeds to step S49. On the other hand, if the determined voice volume level is greater than or equal to the remote-site voice volume level (NO in step S45), the process proceeds to step S49 without the CPU 20 updating the remote-site voice volume level stored in the RAM 22.

In step S49, the CPU 20 determines whether all of the sound information stored in the RAM 22 in step S13 (see FIG. 5) has been extracted in step S30. If the CPU 20 determines that there is sound information not selected in step S30 and remaining in the RAM 22 (NO in step S49), the process returns to step S30 so as to process the remaining sound information. On the other hand, if all of the sound information has been selected in step S30 (YES in step S49), the first determination process ends, and the process returns to the main process (see FIG. 5).

The remote-site voice volume level stored in the RAM 22 in the above-described manner expresses the smallest volume level of the volume levels of voices collected by the sound process apparatuses 31 and 32 disposed in the second site. Furthermore, the remote-site noise volume level expresses the largest volume level of the volume levels of noise collected by the sound process apparatuses 31 and 32 disposed in the second site. Therefore, the remote-site voice volume level and the remote-site noise volume level have a relationship in which the noise volume level is at a maximum relative to the smallest voice volume level. As described above with reference to FIG. 3, each sound process apparatus 10 determines the target volume level based on the relationship between the volume level of voice and the volume level of noise collected by each sound process apparatus 30 in the second site. Therefore, the determined target volume level corresponds to a target volume level at which the voice can be clearly recognized and distinguished from the noise even in an environment where the noise has the maximum effect on the voice. Consequently, the sound process apparatus 10 can make the first user produce voice so that the second user can clearly distinguish the voice of the first user from the noise even when the sound environment surrounding the sound process apparatus 30 in the second site is poor.

As shown in FIG. 5, upon completion of the first determination process (step S15), the CPU 20 executes a second determination process in step S17. In the second determination process, the CPU 20 separates the voice of the first user and the noise from the sound collected in step S11 (see FIG. 5) and determines the volume level of the voice and the volume level of the noise. The determined volume level of the voice is stored in the RAM 22 as a local-site voice volume level. The determined volume level of the noise is stored in the RAM 22 as a local-site noise volume level.

Various known kinds of techniques may be used for separating the voice and the noise from the sound. For example, the CPU 20 may use the same technique as that used for separating the voice and the noise from the sound in the first determination process (see FIG. 6). As another example, the CPU 20 may separate the voice and the noise from the sound by separating the voice and the noise in a frequency-based manner by using a band-pass filter, Fourier transformation, or the like. As another alternative, the voice and the noise may be separated from the sound by using an auto-correlation function.

Upon completion of the second determination process (step S17), the CPU 20 executes a process (third determination process, see FIG. 7) in step S19 for determining a target volume level based on the local-site voice volume level, the local-site noise volume level, the remote-site voice volume level, and the remote-site noise volume level stored in the RAM 22. The third determination process will be described below with reference to FIG. 7. In step S51 (see S6 in FIG. 3), the CPU 20 calculates a difference between the remote-site voice volume level and the remote-site noise volume level stored in the RAM 22. Then, the CPU 20 applies the calculated difference to the function 70 (see FIG. 4) so as to determine the variable Y. The CPU 20 multiplies the determined variable Y by the difference calculated in step S51 so as to calculate the increment D (see S7 in FIG. 3). In step S53 (see S8 in FIG. 3), the CPU 20 determines the target volume level by adding the local-site noise volume level stored in the RAM 22 to the calculated increment D.

At this point, target volume levels are similarly calculated in the sound process apparatuses 12 and 13 disposed in the first site. The CPU 20 performs steps S55 to S63 so as to cause the output units 28 of the sound process apparatuses 11, 12, and 13 disposed in the first site to display information for notifying the first user of the same target volume level. First, in step S55, the CPU 20 determines whether another sound process apparatus 10 is disposed in the first site. In a case where there is no sound process apparatuses 12 or 13 disposed in the first site, unlike FIG. 1, such that the sound process apparatus 11 is not connected to the sound process apparatuses 12 or 13 (NO in step S55), the target volume level determined in step S53 is active so that the third determination process ends, and the process returns to the main process (see FIG. 5).

On the other hand, if the sound process apparatus 11 and at least one of apparatus 12 and apparatus 13 are disposed in the first site and are connected to each other (YES in step S55), as shown in FIG. 1, the CPU 20 adds notification data for notification of the target volume level determined in step S53 and the local-site voice volume level to an ID of the sound process apparatus 11 and transmits the notification data to the sound process apparatuses 12 and 13 in step S57. Then, in step S59, the CPU 20 receives notification data similarly transmitted from the sound process apparatuses 12 and 13.

The volume level of the voice collected by the microphone 25 provided in the sound process apparatus 11 is previously determined by the CPU 20 in the second determination process (step S17 (see FIG. 5)). Moreover, the determined volume level of the voice is stored in the RAM 22 as a local-site voice volume level by the CPU 20 (step S17 (see FIG. 5)). Furthermore, the CPU 20 can obtain the volume levels of the voices collected by the sound process apparatuses 12 and 13 based on the notification data received in step S59. In step S61, the CPU 20 compares the volume levels of the voices collected by the sound process apparatuses 12 and 13 with the local-site voice volume level so as to determine which sound process apparatus 10 has collected the voice with the greatest volume level. The CPU 20 selects the target volume level calculated by the determined sound process apparatus 10 from among the target volume levels notified by the notification data received in step S59 or the target volume level calculated in step S53. In step S63, the CPU 20 corrects the target volume level calculated in step S53 based on the target volume level selected in the above-described manner. In this case, in a display process (step S21, see FIG. 5) to be described later, information indicating the corrected target volume level is displayed on the output unit 28 (see FIG. 1) in place of information indicating the target volume level determined in step S53. The third determination process ends, and the process returns to the main process (see FIG. 5).

By performing the above process, the sound process apparatus 11 can determine the target volume level calculated in the sound process apparatus 10 that is disposed closest to the first user among the sound process apparatuses 11, 12, and 13 disposed in the first site. This is based on the assumption that the user is located closer to the sound process apparatus 10 as the volume level of the voice collected by the microphone 25 increases. Accordingly, the sound process apparatus 10 can determine an optimal target volume level from among the target volume levels determined by the sound process apparatuses 10 disposed in the first site and notify the first user of the optimal target volume level.

As shown in FIG. 5, upon completion of the third determination process (step S19), the CPU 20 causes the output unit 28 to display a notification screen in step S21 for notifying the first user of the target volume level determined in the third determination process. Notification screens 61 to 63 displayed on the output unit 28 will be described below with reference to FIG. 8. The notification screens 61 to 63 are to be displayed on the output unit 28 under different conditions.

The notification screens 61 to 63 are each provided with a first display section 64, a second display section 65, and a third display section 66. The first display section 64 is for displaying the volume level of sound that can be collected by the microphone 25 in multiple levels, e.g., ten levels. The first display section 64 includes ten rectangles 641 arranged in the vertical direction, and ten numerals 642 disposed to the left of the respective rectangles 641. The numerals 642 represent the number of levels counted from the bottom. The second display section 65 shows the volume level of voice actually collected by the microphone 25. The second display section 65 is displayed so as to fill the rectangle or rectangles 641 in the first display section 64. The third display section 66 is for showing a target volume level. The third display section 66 has frame borders that are thicker than frame borders surrounding the rectangles 641 in the first display section 64, and is displayed over the rectangles 641 in the first display section 64. For example, the notification screen 61 shows that the volume level of voice actually collected by the microphone 25 is at level 5, and that the target volume level is at level 7. Furthermore, the notification screen 62 shows that the volume level of voice actually collected by the microphone 25 is at level 7, and that the target volume level is at level 5.

The CPU 20 calculates the percentage of the local-site voice volume level stored in the RAM 22 relative to the volume level of sound that can be collected by the microphone 25 so as to determine to which level the second display section 65 is to be displayed in the first display section 64. For example, if the local-site voice volume level is level 5 relative to a volume level 10 of sound that can be collected by the microphone 25, the second display section 65 is displayed within the first to fifth rectangles 641 in the first display section 64, as shown in the notification screen 61. Furthermore, if the target volume level is determined as being level 7 relative to the volume level 10 of sound that can be collected by the microphone 25, the CPU 20 causes the third display section 66 to be displayed over the seventh to tenth rectangles 641 in the first display section 64, as shown in the notification screen 61.

For example, when the first user produces voice toward the sound process apparatus 11, and the notification screen 61 is displayed on the output unit 28, the first user can recognize that the volume level (level 5) of the produced voice has not reached the target volume level (level 7). The first user may produce voice somewhat louder so as to recognize that the volume level of the voice can reach the target volume level. Furthermore, for example, when the first user produces voice toward the sound process apparatus 11, and the notification screen 62 is displayed on the output unit 28, the first user can confirm that the volume level (level 7) of the produced voice has reached the target volume level (level 5) so that the second user is capable of recognizing the voice by distinguishing the voice from the noise. Accordingly, the first user can recognize the level of the volume level of the produced voice relative to the target volume level. Therefore, the first user can produce voice with a volume level intentionally toward the target volume level.

Furthermore, the notification screen 63 displays only the first display section 64 and the second display section 65 but not the third display section 66. This state in which the third display section 66 is not displayed indicates that the target volume level is greater than the maximum volume level of sound receivable by the microphone 25. This means that even if the first user produces voice at the maximum volume level receivable by the microphone 25, the volume level of the voice will not reach the target volume level. Therefore, even if the first user produces a loud voice at any volume level, the second user will not be able to recognize the voice since the voice is not distinguishable from the noise. Accordingly, the sound process apparatus 11 can notify the first user in advance that the microphone 25 cannot collect the voice at the target volume level even if the first user produces the voice with a large volume level.

As shown in FIG. 5, after the notification screens 61 to 63 are displayed on the output unit 28, the CPU 20 determines whether a command for terminating the teleconference is detected via the input unit 27 in step S23. If the command for terminating the teleconference is not detected (NO in step S23), the process returns to step S10 so that the output unit 28 continuously displays the notification screens 61 to 63. On the other hand, if the command for terminating the teleconference is detected (YES in step S23), the main process ends.

As described above, the sound process apparatus 10 calculates the target volume level and notifies the first user of the target volume level so as to make the user produce voice with an appropriate volume level. Consequently, the second users using the sound process apparatuses 31 and 32 disposed in the second site can clearly recognize the voice of the first user via the sound process apparatuses 31 and 32. Since the sound process apparatus 10 determines the target volume level T based on the remote-site voice volume level and the remote-site noise volume level, the sound process apparatus 10 can make the first user produce voice with a volume level sufficiently greater than the volume level of the noise. Thus, the second users can recognize the voice of the first user output from the speakers 24 provided in the sound process apparatuses 31 and 32 by clearly distinguishing the voice from the noise.

If multiple sound process apparatuses 10 are disposed in the same site, each sound process apparatus 10 determines that the sound process apparatus 10 with the largest volume level of collected voice is collecting the user's voice most efficiently among these sound process apparatuses 10. Furthermore, the sound process apparatus 10 determines that the sound process apparatus 10 efficiently collecting the user's voice is disposed at a position where the user's voice can be most readily collected, that is, at a position closest to the user. In this case, information indicating the target volume level determined in the corresponding sound process apparatus 10 is displayed on the output units 28 of all of the sound process apparatuses 10 disposed within the same site. The reason is, if the multiple sound process apparatuses 10 display different information, it would be difficult for the users to decide which information to believe in. The sound process apparatuses 10 display information indicating the same target volume level so as to uniformly notify the users of the target volume level.

The CPU 20 performing step S13 corresponds to an example of an obtaining unit according to the present disclosure. The CPU 20 performing step S15 corresponds to an example of a first determination unit according to the present disclosure. The CPU 20 performing step S17 corresponds to an example of a second determination unit according to the present disclosure. The CPU 20 performing step S53 corresponds to an example of a third determination unit according to the present disclosure. The CPU 20 performing step S21 corresponds to an example of a notification unit according to the present disclosure. The CPU 20 performing steps S13 and S59 corresponds to an example of a further obtaining unit according to the present disclosure.

The present disclosure is not limited to the illustrative embodiment described above, and permits various modifications. The system configuration in FIG. 1 is an example of the present disclosure, and may be another system configuration. For example, communication between the local site and the remote site may be performed by using various known types of external communication networks, such as a fixed telephone network, a mobile telephone network, or a dedicated communication network, in place of the Internet network 16. The sound process apparatuses 10 may be connected to the external communication network via various types of devices (such as a fixed telephone network, a mobile telephone network, a router, or a modem) other than the sound process apparatuses 10 in place of the PC 15. Furthermore, the sound process apparatuses 10 may be directly connected to the external communication network.

Although each sound process apparatus 10 is provided with the speaker 24 and the microphone 25 in the above description, the sound process apparatus 10 may alternatively be connected to an external speaker and an external microphone instead of being provided with the speaker 24 and the microphone 25. In the above description, a target volume level is calculated based on the difference between the remote-site voice volume level and the remote-site noise volume level stored in the RAM 22. Alternatively, the sound process apparatus 10 may calculate a target volume level based on the ratio between the remote-site voice volume level and the remote-site noise volume level. Furthermore, the sound process apparatus 10 may calculate a target volume level based only on the information of any one of the local-site voice volume level, the local-site noise volume level, the remote-site voice volume level, and the remote-site noise volume level. The sound process apparatus 10 may notify the first user of the target volume level alone but not notify the volume level of the voice produced by the first user. Furthermore, for example, the sound process apparatus 10 may cause the output unit 28 to only display information indicating whether the voice produced by the first user has reached the target volume level.

Figure 6A:
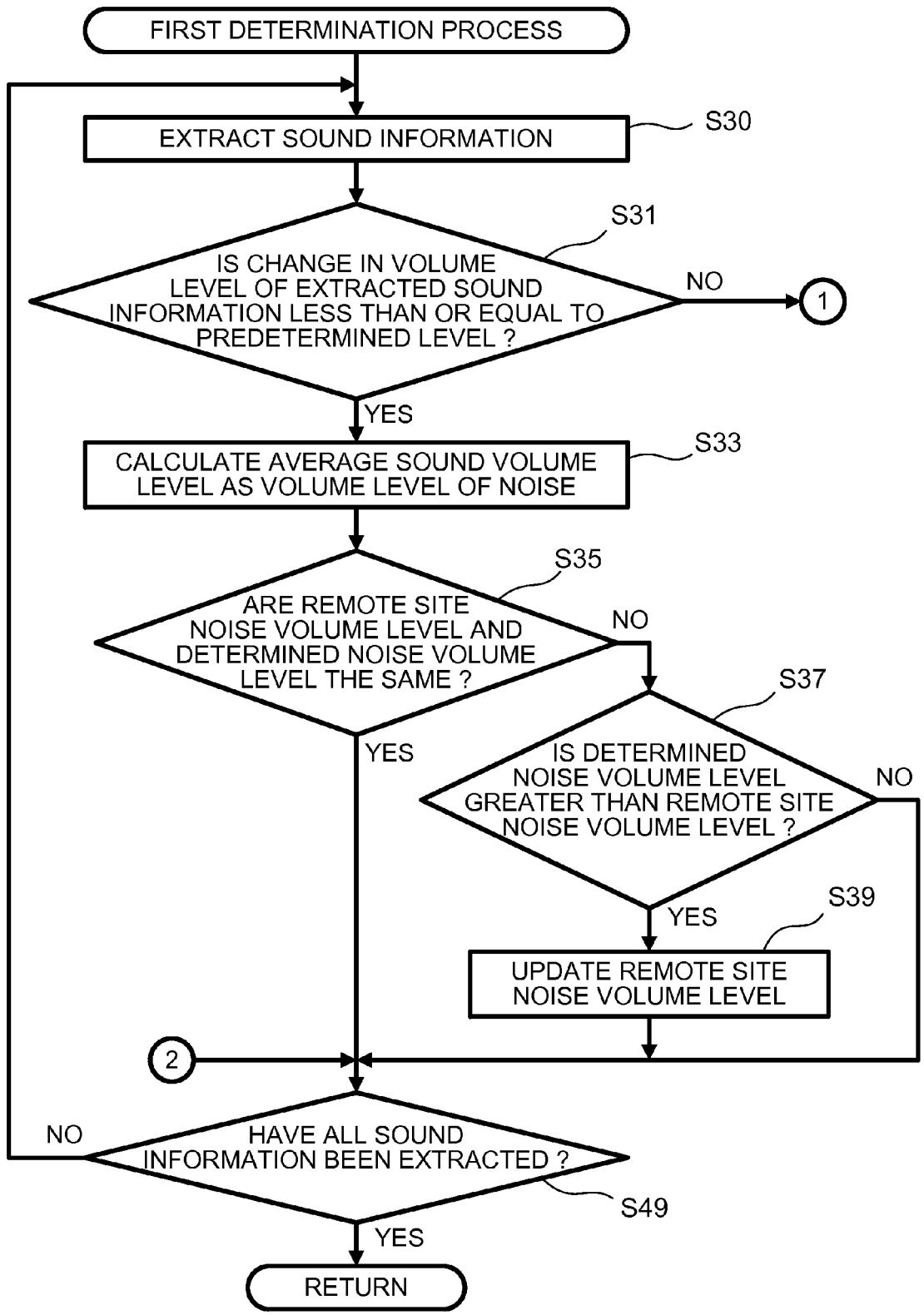
FIG. 6A is a flowchart illustrating a first determination process.
Figure 7:
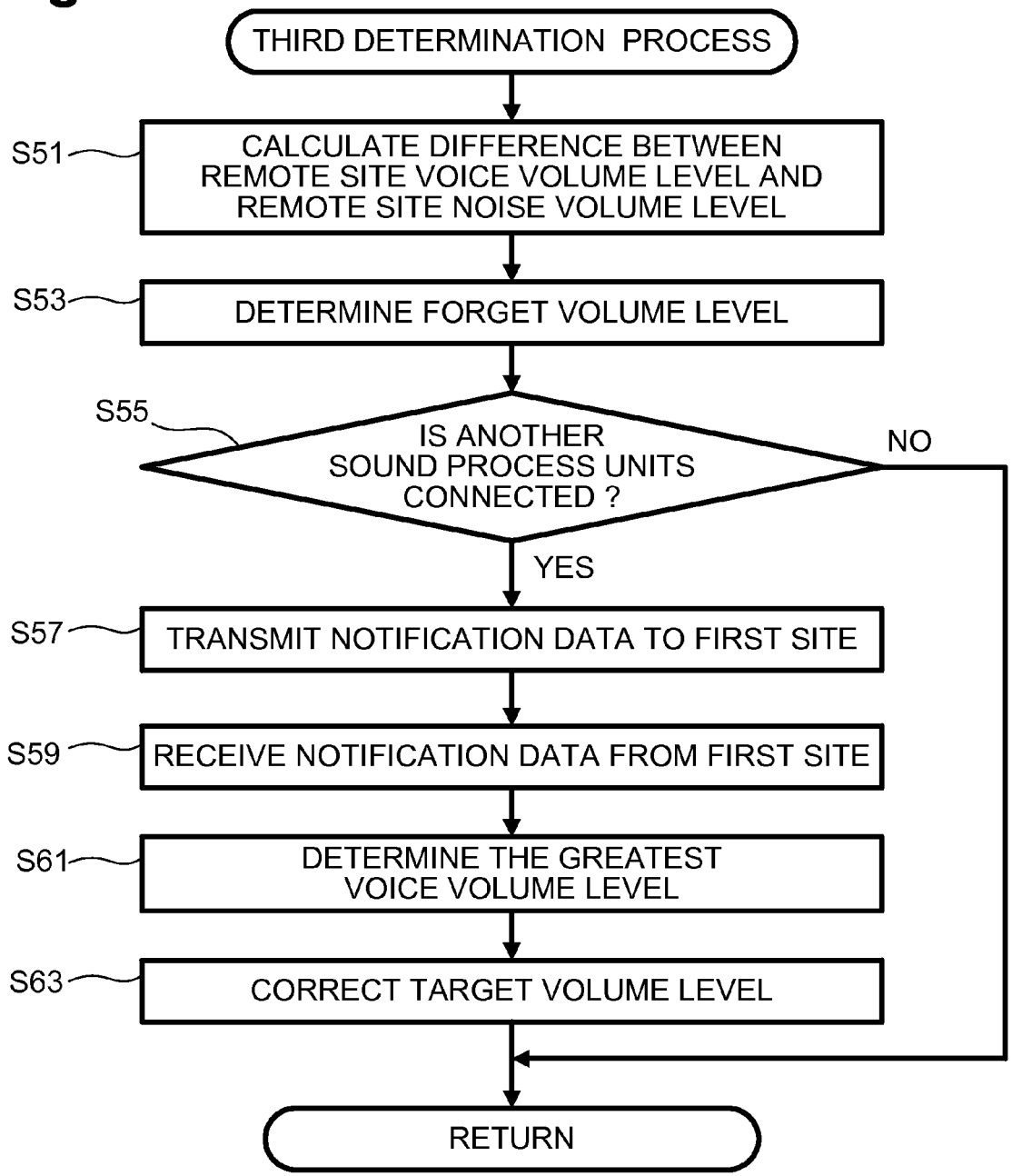
FIG. 7 is a flowchart illustrating a third determination process.

In the above description, each sound process apparatus 10 is connected to the PC 15 so as to serve as a dedicated terminal that executes the main process shown in FIGS. 5 to 7. Alternatively, for example, a sound process apparatus may be configured by storing a sound processing program for executing the main process shown in FIGS. 5 to 7 in a storage medium, such as a hard disk, provided in the PC 15, and causing a CPU in the PC 15 to execute the sound processing program. Specifically, the term "sound process apparatus" is not limited to a terminal different from a PC, but may be a device obtained by installing a specific sound processing program into a storage medium of a general-purpose PC.

In the above description, the process for determining the volume level of voice and the volume level of noise in the second site (step S15 in FIG. 5) is executed based on the sound information received in step S13 from the sound process apparatus 31 disposed in the second site. However, the process for determining the volume level of voice and the volume level of noise in the second site is not limited to the above process. For example, it is assumed that step S17 in FIG. 5 is performed immediately after step S10 so that the volume level of voice and the volume level of noise in the first site are determined. Then, in step S11, the sound information is transmitted to the sound process apparatus 31 disposed in the second site in a state where the determined volume level of the voice and the determined volume level of the noise in the first site are contained in the sound information. Accordingly, the first determination process in step S15 is replaced by a simpler process. In detail, the sound information from the second site received in step S13 also contains the volume level of the voice and the volume level of the noise in the second site determined by the sound process apparatus 31. Specifically, the first determination process in step S15 is replaced by a process for determining, namely, extracting, the volume level of the voice and the volume level of the noise contained in the sound information.

The sound process apparatus 11 adjusts the target volume level relative to those of the other sound process apparatuses 12 and 13 disposed in the first site so as to display the same target volume level on the output units 28 thereof. Alternatively, the sound process apparatuses 10 may output different target volume levels individually determined by the sound process apparatuses 10 to the output units 28 thereof. If there are multiple first users, each sound process apparatus 10 may transmit the sounds from all of the users as sound information to the other sound process apparatuses 10 and 30, or may transmit different sound information for each user. Furthermore, if the sound process apparatuses 10 receive different sound information for each user, the sound process apparatuses 10 may determine different target volume levels for the respective users and notify the users of the respective target volume levels by displaying the target volume levels on the output units 28 together with identification information of the users.

Figure 8:
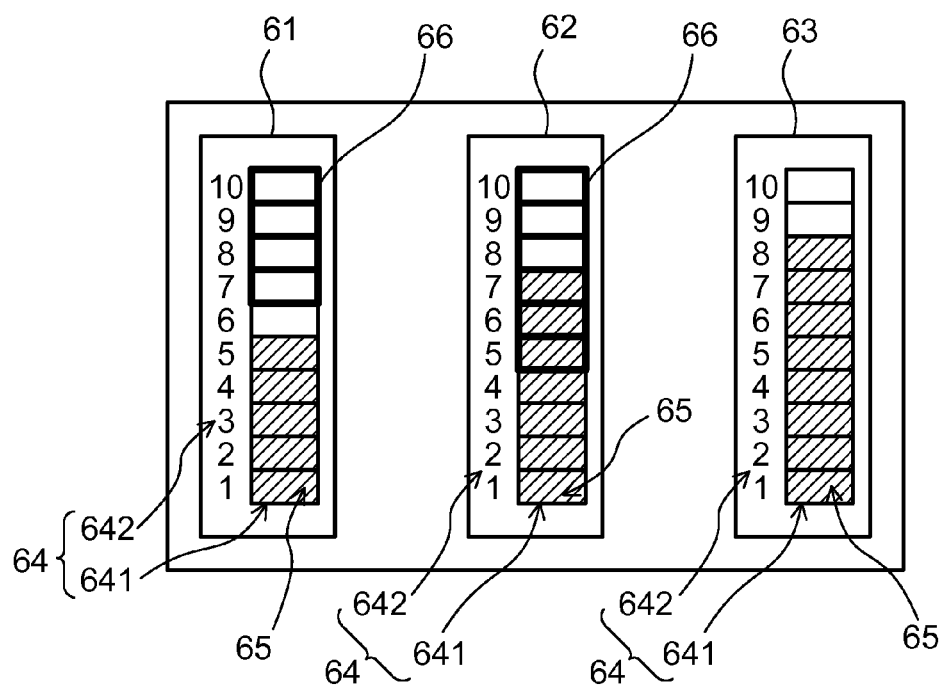
FIG. 8 illustrates notification screens displayed on an output unit.

The notification screens 61 to 63 described above may be in a different mode. In FIG. 8, the first display section 64 and the third display section 66 are differentiated from each other by giving the third display section 66 frame borders that are thicker than the frame borders of the first display section 64. Alternatively, for example, the two sections may be differentiated from each other by giving the third display section 66 frame borders with a color that is different from that of the frame borders of the first display section 64. In detail, for example, the first display section 64 may have red frame borders, and the third display section 66 may have blue frame borders. Furthermore, the frame borders of the first display section 64 in the notification screen 63 may be displayed with a color different from that of the frame borders in the notification screens 61 and 62. Accordingly, even when the first user produces voice with a large volume level, a notification indicating that the voice cannot be collected at the target volume level by the microphone 25 can be clearly provided.

Figure 9:
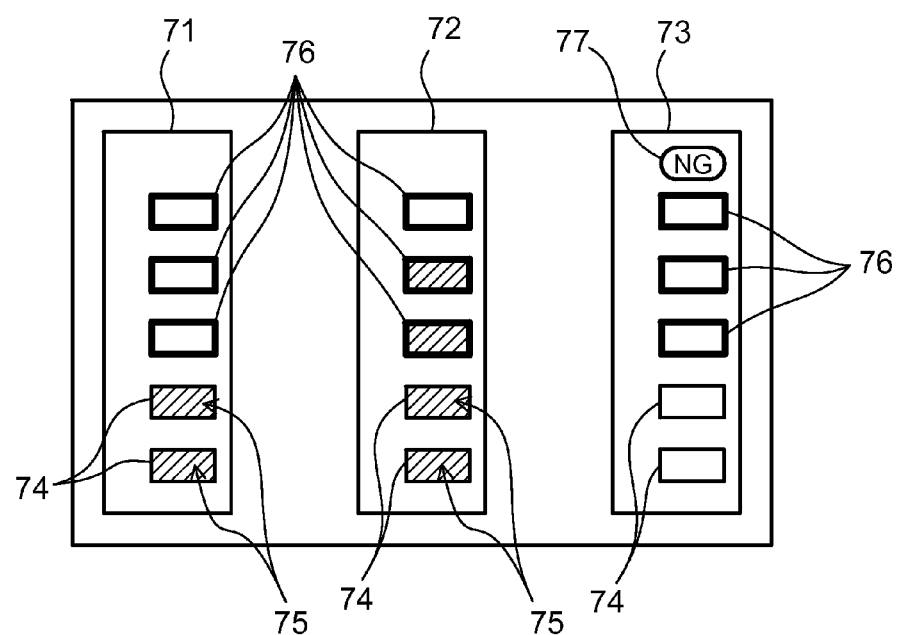
FIG. 9 illustrates notification screens displayed on the output unit.

Notification screens 71 to 73, which are other examples of notification screens displayed on the output unit 28, will now be described with reference to FIG. 9. The notification screens 71 to 73 are each provided with a first display section 74, a second display section 75, and a third display section 76. The first display section 74 includes two rectangles arranged in the vertical direction. The third display section 76 includes three rectangles arranged in the vertical direction above the rectangles in the first display section 74. The rectangles in the third display section 76 are surrounded by frame borders that are thicker than frame borders surrounding the rectangles in the first display section 74. The second display section 75 is displayed so as to fill the first display section 74 and the third display section 76.

In each of the notification screens 71 to 73, a target volume level is indicated by a border between the first display section 74 and the third display section 76. The second display section 75 shows the volume level of voice actually collected by the microphone 25. The notification screens 71 to 73 differ from the notification screens 61 to 63 in that the number of the rectangles in the third display section 76 is fixed and is always set at three even when the level of the target volume level changes.

The CPU 20 calculates the level of the local-site voice volume level stored in the RAM 22 relative to the target volume level so as to determine to which level the second display section 75 is to be displayed in the first display section 74 and the third display section 76. For example, if the local-site voice volume level and the target volume level are at the same level, the CPU 20 causes the second display section 75 to be displayed within two rectangles in the first display section 74, as shown in the notification screen 71. If the target volume level is level 5 relative to a local-site voice volume level of level 7, the CPU 20 causes the second display section 75 to be displayed in the two rectangles of the first display section 74 and the two rectangles from the bottom of the three rectangles in the third display section 76, as shown in the notification screen 72. In each of the notification screens 71 to 73, the border indicating the target volume level is always disposed substantially in the middle in the vertical direction so that the first user can recognize the target volume level more intuitively.

On the other hand, the notification screen 73 shows a display mode in which the target volume level is greater than the maximum volume level of sound receivable by the microphone 25. In this case, the CPU 20 causes characters "NG" 77 to be displayed above the third display section 76. Accordingly, the sound process apparatuses 10 displays the notification screens 71 to 73 on the output unit 28 so that even if the first user produces voice with a large volume level, the first user can be more clearly notified that the voice cannot be collected at the target volume level by the microphone 25, as compared with the notification screens 61 to 63.

What is claimed is:

1. A sound process apparatus comprising:
a processor;
a memory having machine executable instructions stored thereon that, when executed by the processor, cause the sound process apparatus to perform operations comprising:
obtaining sound data based on sound collected by a remote microphone disposed in a remote site;
first determining a volume level of voice and a volume level of noise in the remote site based on the obtained sound data;
second determining a volume level of noise in a local site based on the sound collected by a local microphone disposed in the local site;
third determining a target volume level based on the volume level of the voice in the remote site, the volume level of the noise in the remote site, and the volume level of the noise in the local site; and
notifying a user of information related to the target volume level, and
obtaining the volume level of the voice and the target volume level from a second sound process apparatus disposed in the local site,
wherein the second determining includes determining a volume level of voice in the local site based on the sound collected by the local microphone, and
wherein the third determining includes:
determining whether the volume of the voice from the second sound processing apparatus is greater than the volume of the voice in the local site determined by the second determining, and
determining the target volume from the second sound processing apparatus as the target volume when the volume of the voice from the second sound processing apparatus is greater than the volume of the voice in the local site determined by the second determining.

2. The sound process apparatus according to claim 1, wherein the third determining includes determining the target volume level based on at least one of a difference and a ratio between the volume level of the voice in the remote site and the volume level of the noise in the remote site.

3. The sound process apparatus according to claim 1, wherein
the second determining includes determining a volume level of voice in the local site based on the sound collected by the local microphone, and wherein
the notifying includes notifying a user of information indicating a relationship between the target volume level and the volume level of the voice in the local site as the information related to the target volume level.

4. The sound process apparatus according to claim 1, wherein notifying a user of information showing that the target volume level exceeds a maximum volume level when the target volume level exceeds a maximum volume level which the local microphone is able to collect sound.

5. The sound process apparatus according to claim 1, wherein
the obtaining includes obtaining a plurality of the sound data collected by a plurality of the remote microphones disposed in a remote site, and wherein
the first determining includes determining the smallest volume level of the voice among the plurality of the sound data as the volume level of the voice in the remote site and the largest volume level of the noise among the plurality of the sound data as the volume level of the noise in the remote site.

6. A non-transitory computer readable storage medium storing computer readable instructions that, when executed by a computer, perform operations comprising:
obtaining a plurality of sound data based on sound collected by a plurality of remote microphones disposed in a remote site;
determining a volume level of voice and a volume level of noise in the remote site based on the obtained plurality of sound data;
determining a volume level of noise in a local site based on the sound collected by a local microphone disposed in the local site;
determining a target volume level based on the determined volume level of the voice in the remote site, the determined volume level of the noise in the remote site, and the determined volume level of the noise in the local site; and
notifying a user of information related to the target volume level,
wherein the determining the volume level of the voice and the volume level of the noise in the remote site includes determining a smallest volume level of the voice among the plurality of the sound data as the volume level of the voice in the remote site and a largest volume level of the noise among the plurality of the sound data as the volume level of the noise in the remote site.

7. The non-transitory computer readable storage medium according to claim 6, wherein the determining the target volume level further includes determining the target volume level based on at least one of a difference and a ratio between the volume level of the voice in the remote site and the volume level of the noise in the remote site.

8. The non-transitory computer readable storage medium according to claim 6, wherein the determining the volume level of the noise in the local site further includes determining the volume level of voice in the local site based on the sound collected by the local microphone, and wherein the notifying includes notifying a user of information indicating a relationship between the target volume level and the volume level of the voice in the local site as the information related to the target volume level.

9. The non-transitory computer readable storage medium according to claim 6, wherein the notifying further includes notifying a user of information showing that the target volume level exceeds a maximum volume level when the target volume level exceeds a maximum volume level which the local microphone is able to collect sound.

10. The non-transitory computer readable storage medium according to claim 6, further storing computer readable instructions that, when executed by a computer, perform operations comprising:

obtaining the volume level of the voice and the target volume level from a second computer disposed in the local site, wherein the determining the volume level of the noise in the local site further includes determining the volume level of the voice in the local site based on the sound collected by the local microphone, and wherein the determining the target volume level includes:
determining whether the volume of the voice from the second computer is greater than the determined volume of the voice in the local site, and
determining the target volume from the second computer as the target volume when the volume of the voice from the second computer is greater than the determined volume of the voice in the local site.

11. A method for a conference system comprising:

obtaining, by a processor disposed in a local site via a communication interface, sound data based on sound collected by a remote microphone disposed in a remote site;

determining, by the processor disposed in the local site, a volume level of voice and a volume level of noise in the remote site based on the obtained sound data;

determining, by the processor disposed in the local site, a volume level of noise in the local site based on the sound collected by a local microphone in the local site;

determining, by the processor disposed in the local site, a target volume level based on the determined volume level of the voice in the remote site, the determined volume level of the noise in the remote site, and the determined volume level of the noise in the local site;

displaying, on a display, information related to the target volume level; and obtaining, by the processor disposed in the local site, the volume level of the voice and the target volume level from another processor disposed in the local site, wherein the determining the volume level of the noise in the local site further includes determining the volume level of the voice in the local site based on the sound collected by the local microphone, and wherein the determining the target volume level includes:
determining whether the volume of the voice from the other processor is greater than the determined volume of the voice in the local site, and
determining the target volume from the other processor as the target volume when the volume of the voice from the other processor is greater than the determined volume of the voice in the local site.

12. The method according to claim 11, wherein the determining the target volume level further includes determining the target volume level based on at least one of a difference and a ratio between the volume level of the voice in the remote site and the volume level of the noise in the remote site.

13. The method according to claim 11, wherein the determining the volume level of the noise in the local site further includes determining the volume level of voice in the local site based on the sound collected by the local microphone, and wherein the displaying includes displaying information indicating a relationship between the target volume level and the volume level of the voice in the local site as the information related to the target volume level.

14. The method according to claim 11, wherein the displaying further includes displaying information showing that the target volume level exceeds a maximum volume level when the target volume level exceeds a maximum volume level which the local microphone is able to collect sound.

15. The method according to claim 11, wherein the obtaining further includes obtaining a plurality of the sound data collected by a plurality of the remote microphones disposed in a remote site, and wherein the determining the volume level of the voice and the volume level of the noise in the remote site includes determining the smallest volume level of the voice among the plurality of the sound data as the volume level of the voice in the remote site and the largest volume level of the noise among the plurality of the sound data as the volume level of the noise in the remote site.

* * * * *